(12) United States Patent
Liao et al.

(10) Patent No.: US 11,772,984 B2
(45) Date of Patent: Oct. 3, 2023

(54) INFRARED REFLECTIVE MATERIAL AND METHOD FOR PRODUCING THE SAME, AND INFRARED REFLECTIVE STRUCTURE

(71) Applicant: NAN YA PLASTICS CORPORATION, Taipei (TW)

(72) Inventors: Te-Chao Liao, Taipei (TW); Sen-Huang Hsu, Taipei (TW); Wei-Sheng Cheng, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 154 days.

(21) Appl. No.: 17/475,322

(22) Filed: Sep. 14, 2021

(65) Prior Publication Data
US 2022/0212948 A1 Jul. 7, 2022

(30) Foreign Application Priority Data
Jan. 6, 2021 (TW) .................................. 110100441

(51) Int. Cl.
*C01G 41/00* (2006.01)
*B82Y 40/00* (2011.01)

(52) U.S. Cl.
CPC ............ *C01G 41/006* (2013.01); *B82Y 40/00* (2013.01); *C01P 2004/64* (2013.01); *C01P 2006/60* (2013.01)

(58) Field of Classification Search
CPC ........ C01G 41/00; C01G 41/06; B82Y 40/00; C01P 2004/64; C01P 2006/60; C09K 11/7776
See application file for complete search history.

(56) References Cited

FOREIGN PATENT DOCUMENTS

| CN | 105110377 A | * 12/2015 |
| CN | 105307996 A | 2/2016 |
| CN | 110591706 A | 12/2019 |
| JP | 2007311208 A | 11/2007 |

(Continued)

OTHER PUBLICATIONS

Baccaro, Stefania. "Recent progress in the development of lead tungstate crystals." IEEE Transactions on Nuclear Science 46.3 (1999): 292-295.*

*Primary Examiner* — Richard M Rump
(74) *Attorney, Agent, or Firm* — Li & Cai Intellectual Property Office (57) ABSTRACT

An infrared reflective material, a method for producing the same, and an infrared reflective structure are provided. The method includes a preparation step implemented by mixing antimony and zirconium tungstate through a sol-gel manner to form zirconium tungstate composite powders doped with the antimony; a sintering step implemented by sintering the antimony and the zirconium tungstate in the zirconium tungstate composite powders doped with the antimony in a temperature gradient within a range from 500° C. to 1,100° C. for a predetermined time period, so that the antimony and the zirconium tungstate in the zirconium tungstate composite powders doped with the antimony bond together to form into composite tungsten oxide powders; a grinding step implemented by grinding the composite tungsten oxide powders; and a mixing step implemented by mixing the composite tungsten oxide powders that are grinded into an acrylic resin to form the infrared reflective material.

14 Claims, 4 Drawing Sheets

(56) References Cited

FOREIGN PATENT DOCUMENTS

| | | | |
|---|---|---|---|
| JP | 2011094086 | A | 5/2011 |
| JP | 2016184052 | A | 10/2016 |
| TW | 201930478 | A | 8/2019 |

\* cited by examiner

INFRARED REFLECTIVE MATERIAL AND METHOD FOR PRODUCING THE SAME, AND INFRARED REFLECTIVE STRUCTURE

CROSS-REFERENCE TO RELATED PATENT APPLICATION

This application claims the benefit of priority to Taiwan Patent Application No. 110100441, filed on Jan. 6, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a reflective material, a method for producing the same, and a reflective material structure, and more particularly to an infrared reflective material, a method for producing the same, and an infrared reflective material structure.

BACKGROUND OF THE DISCLOSURE

Generally, in a conventional method for producing an infrared reflective material, the infrared reflective material is produced in a multi-layer sputtering manner. In addition, a conventional infrared reflective material produced in the multi-layer sputtering manner provides a total reflection effect through a plurality of film layers (e.g., about 200 to 300 film layers) having different refractive indices.

However, although the conventional infrared reflective material produced in the multi-layer sputtering manner can provide the total reflection effect, the multi-layer sputtering manner is required to be implemented in a vacuum environment so as to form the film layers. Therefore, the difficulty and the complexity of a production process of the conventional infrared reflective material are relatively high, and the conventional method for producing the infrared reflective material is accordingly not suitable for mass production.

SUMMARY OF THE DISCLOSURE

In response to the above-referenced technical inadequacies, the present disclosure provides an infrared reflective material, a method for producing the same, and an infrared reflective structure.

In one aspect, the present disclosure provides a method for producing an infrared reflective material. The method includes a preparation step, a sintering step, a grinding step, and a mixing step. The preparation step is implemented by mixing antimony and zirconium tungstate through a sol-gel manner to form a plurality of zirconium tungstate composite powders doped with the antimony. The sintering step is implemented by sintering the zirconium tungstate composite powders doped with the antimony in a temperature gradient within a range from 500° C. to 1,100° C. for a predetermined time period, so that the antimony and the zirconium tungstate in the zirconium tungstate composite powders doped with the antimony bond to each other to form into a plurality of composite tungsten oxide powders. The grinding step is implemented by grinding the composite tungsten oxide powders. The mixing step is implemented by mixing the composite tungsten oxide powders that are grinded into an acrylic resin to form the infrared reflective material.

In another aspect, the present disclosure provides an infrared reflective material including an acrylic resin and a plurality of composite tungsten oxide powders mixed in the acrylic resin. A chemical component in the composite tungsten oxide powders has a chemical formula of $Sb:ZrW_2O_8$. Based on 100 parts by weight of the infrared reflective material, a usage range of the composite tungsten oxide powders is greater than or equal to 5 parts by weight. The infrared reflective material has an infrared reflective rate, and the infrared reflective rate is greater than or equal to 80% within a wavelength range from 800 nanometers to 2,500 nanometers.

In yet another aspect, the present disclosure provides an infrared reflective structure including a substrate and a coating layer formed on a surface of the substrate. The coating layer is formed by coating the infrared reflective material onto the surface of the substrate under a normal pressure.

Therefore, one of the beneficial effects of the present disclosure is that, by virtue of "mixing antimony and zirconium tungstate through a sol-gel manner to form a plurality of zirconium tungstate composite powders doped with antimony", "sintering the zirconium tungstate composite powders doped with the antimony in a temperature gradient within a range from 500° C. to 1,100° C. for a predetermined time period, so that the antimony and the zirconium tungstate in the zirconium tungstate composite powders doped with the antimony bond to each other to form into a plurality of composite tungsten oxide powders", "grinding the composite tungsten oxide powders", and "mixing the composite tungsten oxide powders that are grinded into an acrylic resin to form an infrared reflective material", the infrared reflective material, the method for producing the infrared reflective material, and the infrared reflective structure of the present disclosure can effectively improve upon issues of a conventional method for producing the infrared reflective material (i.e., a multi-layer sputtering manner of the conventional method for producing the infrared reflective material is required to be implemented in a vacuum environment, the difficulty and complexity of the production process are relatively high, and the conventional method is not suitable for mass production).

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

An embodiment of the present disclosure provides a method for producing an infrared reflective material, an infrared reflective material, and an infrared reflective structure that are sequentially described as follows.

Method for Producing Infrared Reflective Material

Figure 1:
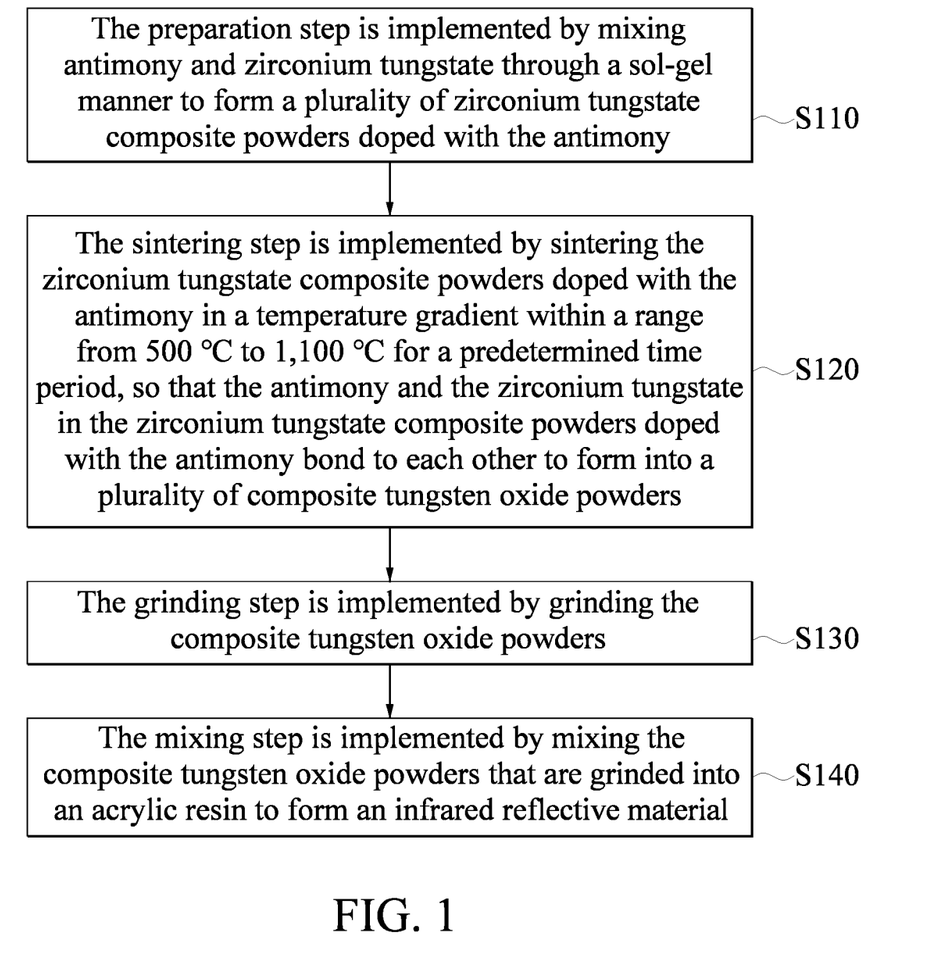
FIG. 1 is a flowchart of a method for producing an infrared reflective material according to an embodiment of the present disclosure.
Figure 2:
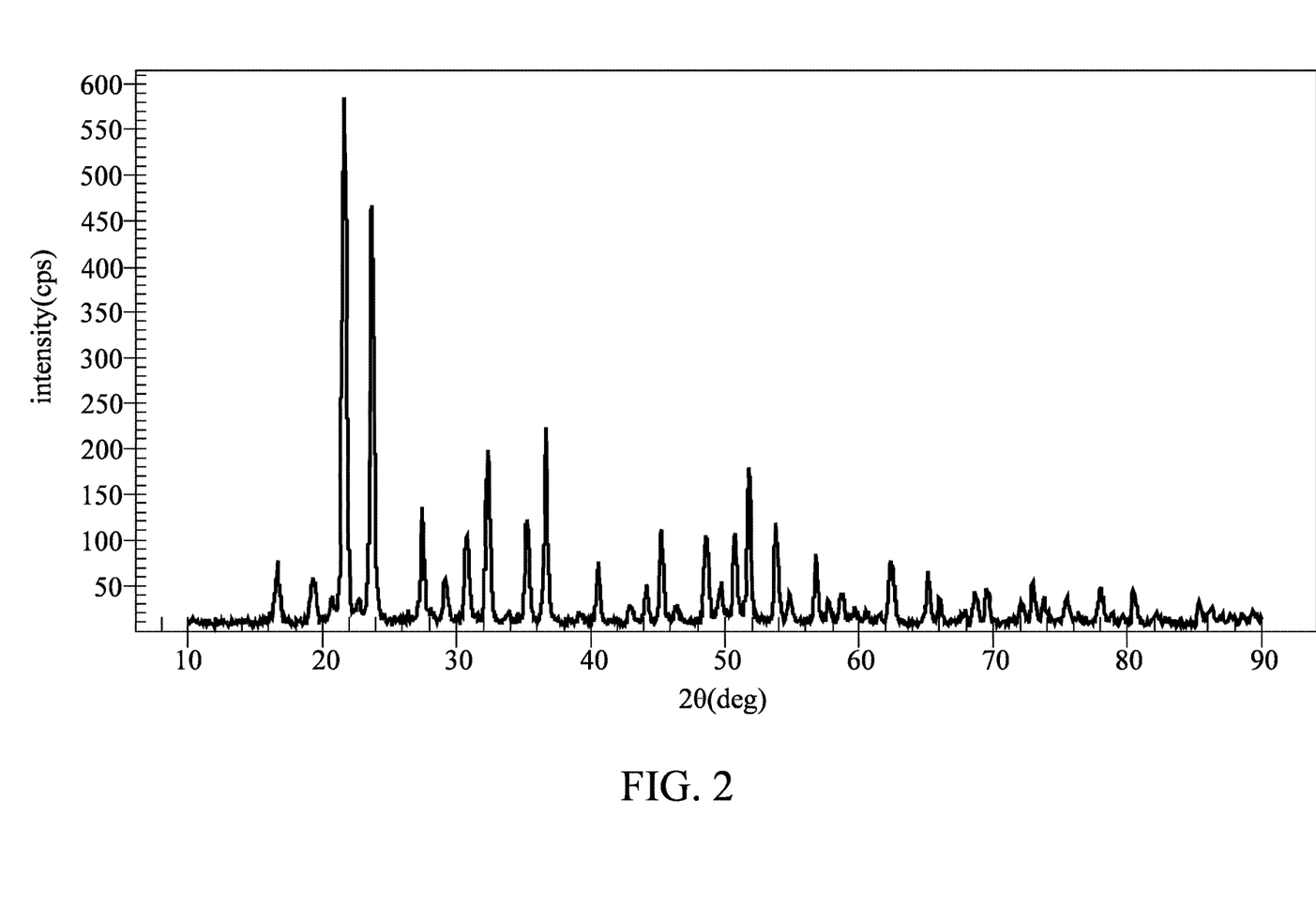
FIG. 2 is a schematic view of an X-ray diffraction spectrum of zirconium tungstate according to the embodiment of the present disclosure.
Figure 3:
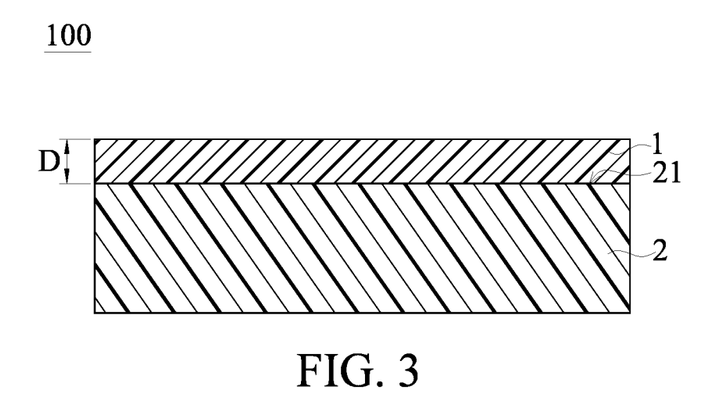
FIG. 3 is a schematic view of an infrared reflective structure according to the embodiment of the present disclosure.

Referring to FIG. 1 to FIG. 3, FIG. 1 is a flowchart of a method for producing an infrared reflective material according to an embodiment of the present disclosure, FIG. 2 is a schematic view of an X-ray diffraction spectrum of zirconium tungstate according to the embodiment of the present disclosure, and FIG. 3 is a schematic view of an infrared reflective structure according to the embodiment of the present disclosure. The embodiment of the present disclosure provides a method for producing an infrared reflective material including a preparation step S110, a sintering step S120, a grinding step S130, and a mixing step S140. The description of the steps included by the method for producing the infrared reflective material is as follows. It should be noted that, when implementing the method for producing the infrared reflective material of the present disclosure, the contents and the sequences of the steps are not limited to the description of the steps.

The preparation step S110 is implemented by mixing antimony and zirconium tungstate through a sol-gel manner to form a plurality of zirconium tungstate composite powders doped with antimony. Through the sol-gel manner, the antimony and the zirconium tungstate can be evenly mixed in a low temperature environment. In addition, based on 100 parts by weight of the zirconium tungstate composite powders doped with antimony, a usage range of the antimony is 0.1 to 1 parts by weight, and a usage range of the zirconium tungstate is within a range from 99 to 99.9 parts by weight. Preferably, the usage range of the antimony is from 0.3 to 0.4 parts by weight, and a usage range of the zirconium tungstate is within a range from 99.6 to 99.7 parts by weight.

In other words, in the preparation step S110, the antimony with a relative low usage range is doped into the zirconium tungstate, and through the sol-gel manner in the preparation step S110, the antimony and the zirconium tungstate move close to each other to form the zirconium tungstate composite powders doped with the antimony. Referring to FIG. 2, an X-ray diffraction spectrum of the zirconium tungstate of the embodiment of the present disclosure has at least one peak greater than 550 cps within a range from 20 degrees to 30 degrees and at least two peaks greater than 450 cps within the range from 20 degrees to 30 degrees.

It should be noted that the zirconium tungstate itself cannot reflect infrared light, and the zirconium tungstate itself cannot absorb visible light. Therefore, the zirconium tungstate composite powders doped with the antimony are formed by doping the antimony into the zirconium tungstate to provide an infrared light reflecting effect. In other words, through material selection and cooperation, the method for producing the infrared reflective material of the present disclosure is not required to be implemented in a multi-layer sputtering manner where a conventional method for producing the infrared reflective material is implemented, thereby reducing the complexity of the production process.

The sintering step S120 is implemented by sintering the zirconium tungstate composite powders doped with the antimony in a temperature gradient within a range from 500° C. to 1,100° C. for a predetermined time period, so that the antimony and the zirconium tungstate in the zirconium tungstate composite powders doped with the antimony bond to each other to form into a plurality of composite tungsten oxide powders. A chemical component in the composite tungsten oxide powders has a chemical formula of $Sb:ZrW_2O_8$, and the antimony bonds onto a surface of the zirconium tungstate in a single bound form. More specifically, through the sintering step S120, the zirconium tungstate composite powders doped with the antimony undergoes a lattice rearrangement, so that the antimony can bond onto the surface of the zirconium tungstate in the single bound form.

In the sintering step S120 of the present embodiment, the temperature gradient is sequentially defined into a first temperature, a second temperature, a third temperature, and a fourth temperature, and the predetermined temperature is within a range for a predetermined time period from 1 hour to 2 hours. Preferably, the first temperature is within a range from 500° C. to 550° C., the second temperature is within a range from 650° C. to 750° C., the third temperature is within a range from 850° C. to 950° C., and the fourth temperature is within a range from 1,050° C. to 1,100° C. More preferably, the first temperature is 500° C., the second temperature is 700° C., the third temperature is 900° C., and the fourth temperature is 1,100° C.

In a practical application, the first temperature, the second temperature, the third temperature, and the fourth temperature can be changed according to practical requirements, and are not limited to the above-mentioned temperatures. The predetermined time period can be changed within the range from 1 hour to 2 hours. In addition, in the present embodiment, the temperature gradient is defined into four different temperatures, but the present disclosure is not limited thereto. In other words, in other embodiments, the temperature gradient can be sequentially defined into three or five different temperatures.

In other embodiments of the present disclosure, before the sintering step S120 and after the preparation step S110, the method for producing the infrared reflective material can further include a preheating step, but the present disclosure is not limited thereto. The preheating step is implemented by preheating the zirconium tungstate composite powders doped with the antimony in a first preheating temperature and a second preheating temperature respectively, the first preheating temperature is about 120° C., and the second preheating temperature is about 360° C.

The grinding step S130 is implemented by grinding the composite tungsten oxide powders. After the composite tungsten oxide powders are grinded, a particle size of each of the composite tungsten oxide powders is less than or equal to 70 nanometers. Preferably, after the composite tungsten oxide powders are grinded, the particle size of each of the composite tungsten oxide powders is within a range from 50 nanometers to 100 nanometers. Since the composite tungsten oxide powders are grinded to a nanoscale, the composite tungsten oxide powders can provide a better light transmittance.

The mixing step S140 is implemented by mixing the composite tungsten oxide powders that are grinded into an acrylic resin to form an infrared reflective material. After the grinding step S130, the composite tungsten oxide powders that are grinded can be better mixed and dispersed in the acrylic resin. The infrared reflective material 1 has an infrared reflective rate, and the infrared reflective rate is greater than or equal to 80% at a wavelength range within a range from 800 nanometers to 2,500 nanometers. That is to say, the infrared reflective material 1 produced through the above-mentioned steps can already provide an excellent infrared reflective rate.

In addition, based on 100 parts by weight of the infrared reflective material 1, a usage range of the composite tungsten oxide powders is greater than or equal to 5 parts by weight. Preferably, based on 100 parts by weight of the infrared reflective material 1, the usage range of the composite tungsten oxide powders is within a range from 5 to 50 parts by weight, and a usage range of the acrylic resin is within a range from 1 to 50 parts by weight.

In other embodiments of the present disclosure, an isopropanol solvent is added into the infrared reflective material 1, but the present disclosure is not limited thereto. Based on 100 parts by weight of the infrared reflective material 1, a usage range of the isopropanol solvent is within a range from 50 to 90 parts by weight, the usage range of the composite tungsten oxide powders is within a range from 5 to 50 parts by weight, and the usage range of the acrylic resin is within a range from 1 to 50 parts by weight.

It should be noted that in the mixing step S140, the composite tungsten oxide powders can be added and evenly mixed into the isopropanol solvent, and then the composite tungsten oxide powders and the isopropanol solvent can be jointly mixed in the acrylic resin. The isopropanol solvent is primarily used to allow the composite tungsten oxide powders to be better mixed in the acrylic resin, and the isopropanol solvent can be replaced by other solvents having a similar property, but the present disclosure is not limited thereto.

Referring to FIG. 3, the infrared reflective material 1 can be coated onto a surface 21 of a substrate 2 under a normal pressure, so that a coating layer forms on the surface 21 of the substrate 2, and a thickness D of the coating layer is within a range from 1 micrometer to 4 micrometers. The substrate 2 can be made of polyethylene terephthalate or other components having a similar property, but the present disclosure is not limited thereto. That is to say, as long as the coating layer formed by the infrared reflective material 1 has the thickness D within the range from 1 micrometer to 4 micrometers, the infrared reflective material 1 can provide an excellent infrared reflective rate.

In addition, the substrate 2 and the coating layer coated on the substrate 2 can be jointly defined as an infrared reflective structure 100. Since the infrared reflective material 1 can be coated onto the surface 21 of the substrate 2 under a normal pressure, the infrared reflective material 1 produced by the method for producing the infrared reflective material is suitable for mass production of the infrared reflective structure 100 under a normal pressure.

According to the above, the infrared reflective material 1 produced by the method for producing the infrared reflective material can be coated onto the surface 21 of the substrate 2 under a normal pressure to form a one-layered structure (e.g., the coating layer), and can provide an excellent infrared reflective effect. Therefore, the infrared reflective material 1 produced by the method for producing the infrared reflective material can effectively improve on an issue of a conventional method for producing the infrared reflective material (i.e., the conventional method for producing the infrared reflective material is required to be implemented in a vacuum environment in a multi-layer sputtering manner).

Infrared Reflective Material

The embodiment of the present disclosure further provides an infrared reflective material 1, the infrared reflective material 1 can be produced by the method for producing the infrared reflective material, but the present disclosure is not limited thereto. The infrared reflective material 1 includes an acrylic resin and a plurality of composite tungsten oxide powders mixed in the acrylic resin. A chemical component in the composite tungsten oxide powders has a chemical formula of $Sb:ZrW_2O_8$.

Based on 100 parts by weight of the infrared reflective material 1, a usage range of the composite tungsten oxide powders is greater than or equal to 5 parts by weight. Preferably, based on 100 parts by weight of the infrared reflective material 1, the usage range of the composite tungsten oxide powders is within a range from 5 to 50 parts by weight, and a usage range of the acrylic resin is within a range from 1 to 50 parts by weight. The infrared reflective material 1 has an infrared reflective rate, and the infrared reflective rate is greater than or equal to 80% at a wavelength range within a range from 800 nanometers to 2,500 nanometers.

Infrared Reflective Structure

Referring to FIG. 3, the embodiment of the present disclosure further provides an infrared reflective structure 100. The infrared reflective structure 100 includes a substrate 2 and a coating layer formed on a surface 21 of the substrate 2, and the coating layer can be formed by coating the infrared reflective material 1 onto the surface 21 of the substrate 2 under a normal pressure. The thickness D of the coating layer is within a range from 1 micrometer to 4 micrometers. In the present embodiment, the substrate 2 is made of polyethylene terephthalate, but the present disclosure is not limited thereto. In addition, the infrared reflective material 1 has an infrared reflective rate, and the infrared reflective rate is greater than or equal to 80% at a wavelength range within a range from 800 nanometers to 2,500 nanometers.

Figure 4:
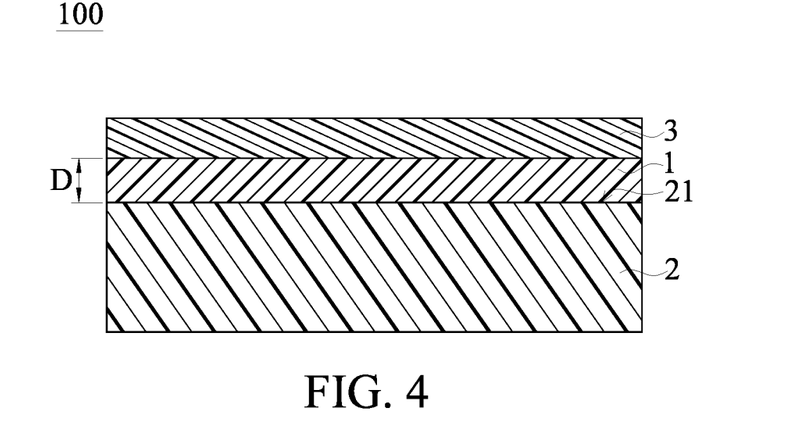
FIG. 4 is a schematic view of the infrared reflective structure according to another embodiment of the present disclosure.

Referring to FIG. 4, FIG. 4 is a schematic view of the infrared reflective structure according to another embodiment of the present disclosure. In the present embodiment, the infrared reflective structure 100 can further include a protective layer 3 formed on one side of the coating layer away from the substrate 2, but the present disclosure is not limited thereto. In other words, the coating layer is arranged between the substrate 2 and the protective layer 3. The protective layer 3 can be made of ethylene phthalate, polyvinyl fluoride, or ethylene-tetrafluoroethylene copolymer, but the present disclosure is not limited thereto. The protective layer 3 can protect the coating layer and can prevent the coating layer from being scratched.

In addition, in other embodiments, the infrared reflective structure 100 can further include two coating layers and two protective layers 3, the two coating layers are respectively formed on two different surfaces of the substrate 2, and each of the protective layers 3 is formed on one side of one of the coating layers. In other words, the quantity of the protective layers 3 of the present disclosure can correspond to the quantity of the coating layers, and the quantity of the coating layers 2 can be changed according to practical requirements and is not limited to being one or two.

Beneficial Effects of the Embodiments

In conclusion, by virtue of "mixing antimony and zirconium tungstate through a sol-gel manner to form a plurality of zirconium tungstate composite powders doped with antimony", "sintering the zirconium tungstate composite powders doped with the antimony in a temperature gradient within a range from 500° C. to 1,100° C. for a predetermined time period, so that the antimony and the zirconium tungstate in the zirconium tungstate composite powders doped with the antimony bond to each other to form into a plurality of composite tungsten oxide powders", "grinding the composite tungsten oxide powders", and "mixing the composite tungsten oxide powders that are grinded into an acrylic resin to form an infrared reflective material", the infrared reflective material, the method for producing the infrared reflective material, and the infrared reflective structure of the present disclosure can effectively improve on the issues of the conventional method for producing the infrared reflective material (i.e., a multi-layer sputtering manner of the conventional method for producing the infrared reflective material is required to be implemented in a vacuum environment, the difficulty and complexity of the production process are relatively high, and the conventional method is not suitable for mass production).

Moreover, after the composite tungsten oxide powders are grinded, a particle size of each of the composite tungsten oxide powders is less than or equal to 70 nanometers, so that the composite tungsten oxide powders can provide a better light transmittance.

Since the composite tungsten oxide powders are added and evenly mixed into the isopropanol solvent, and then the composite tungsten oxide powders and the isopropanol solvent are jointly mixed in the acrylic resin, the composite tungsten oxide powders are better mixed in the acrylic resin.

The infrared reflective structure can further include the protective layer formed on one side of the coating layer away from the substrate, and the protective layer can protect the coating layer and can prevent the coating layer from being scratched.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for producing an infrared reflective material, comprising:
   a preparation step implemented by mixing antimony and zirconium tungstate through a sol-gel manner to form a plurality of zirconium tungstate composite powders doped with antimony;
   a sintering step implemented by sintering the zirconium tungstate composite powders doped with the antimony in a temperature gradient within a range from 500° C. to 1,100° C. for a predetermined time period, so that the antimony and the zirconium tungstate in the zirconium tungstate composite powders doped with the antimony bond to each other to form into a plurality of composite tungsten oxide powders;
   a grinding step implemented by grinding the composite tungsten oxide powders; and
   a mixing step implemented by mixing the composite tungsten oxide powders that are grinded into an acrylic resin to form the infrared reflective material, wherein, in the mixing step, an isopropanol solvent is added into the infrared reflective material, and based on 100 parts by weight of the infrared reflective material, a usage range of the isopropanol solvent is 50 to 90 parts by weight.

2. The method according to claim 1, wherein, based on 100 parts by weight of the zirconium tungstate composite powders doped with the antimony, a usage range of the antimony is from 0.1 to 1 parts by weight.

3. The method according to claim 1, wherein a chemical component in the composite tungsten oxide powders has a chemical formula of $Sb:ZrW_2O_8$.

4. The method according to claim 1, wherein, in the sintering step, the temperature gradient is sequentially defined into a first temperature, a second temperature, a third temperature, and a fourth temperature, and the predetermined time period is within a range from 1 hour to 2 hours.

5. The method according to claim 4, wherein the first temperature is within a range from 500° C. to 550° C., the second temperature is within a range from 650° C. to 750° C., the third temperature is within a range from 850° C. to 950° C., and the fourth temperature is within a range from 1,050° C. to 1,100° C.

6. The method according to claim 1, wherein, after the composite tungsten oxide powders are grinded, a particle size of each of the composite tungsten oxide powders is less than or equal to 70 nanometers.

7. The method according to claim 1, wherein, based on 100 parts by weight of the infrared reflective material, a usage range of the composite tungsten oxide powders is greater than or equal to 5 parts by weight.

8. The method according to claim 1, wherein the infrared reflective material is coated onto a surface of a substrate under a normal pressure to form a coating layer on the surface of the substrate, and a thickness of the coating layer is within a range from 1 micrometer to 4 micrometers.

9. The method according to claim 1, wherein the infrared reflective material has an infrared reflective rate, and the infrared reflective rate is greater than or equal to 80% within a wavelength range from 800 nanometers to 2,500 nanometers.

10. An infrared reflective material, comprising:
an acrylic resin;
a plurality of composite tungsten oxide powders mixed in the acrylic resin, wherein a chemical component in the composite tungsten oxide powders has a chemical formula of $Sb:ZrW_2O_8$; and
an isopropanol solvent;
wherein based on 100 parts by weight of the infrared reflective material, a usage range of the composite tungsten oxide powders is greater than or equal to 5 parts by weight, and a usage range of the isopropanol solvent is 50 to 90 parts by weight;
wherein the infrared reflective material has an infrared reflective rate, and the infrared reflective rate is greater than or equal to 80% within a wavelength range from 800 nanometers to 2,500 nanometers.

11. The infrared reflective material according to claim 10, wherein a particle size of each of the composite tungsten oxide powders is less than or equal to 70 nanometers.

12. An infrared reflective structure, comprising:
a substrate; and
a coating layer formed on a surface of the substrate, wherein the coating layer is formed by coating the infrared reflective material as claimed in claim 10 onto the surface of the substrate under normal pressure.

13. The infrared reflective structure according to claim 12, wherein a thickness of the coating layer is within a range from 1 micrometer to 4 micrometers.

14. The infrared reflective structure according to claim 12, wherein the infrared reflective structure further includes a protective layer, and the protective layer is formed on one side of the infrared reflective material away from the substrate.

* * * * *